Patented May 6, 1952

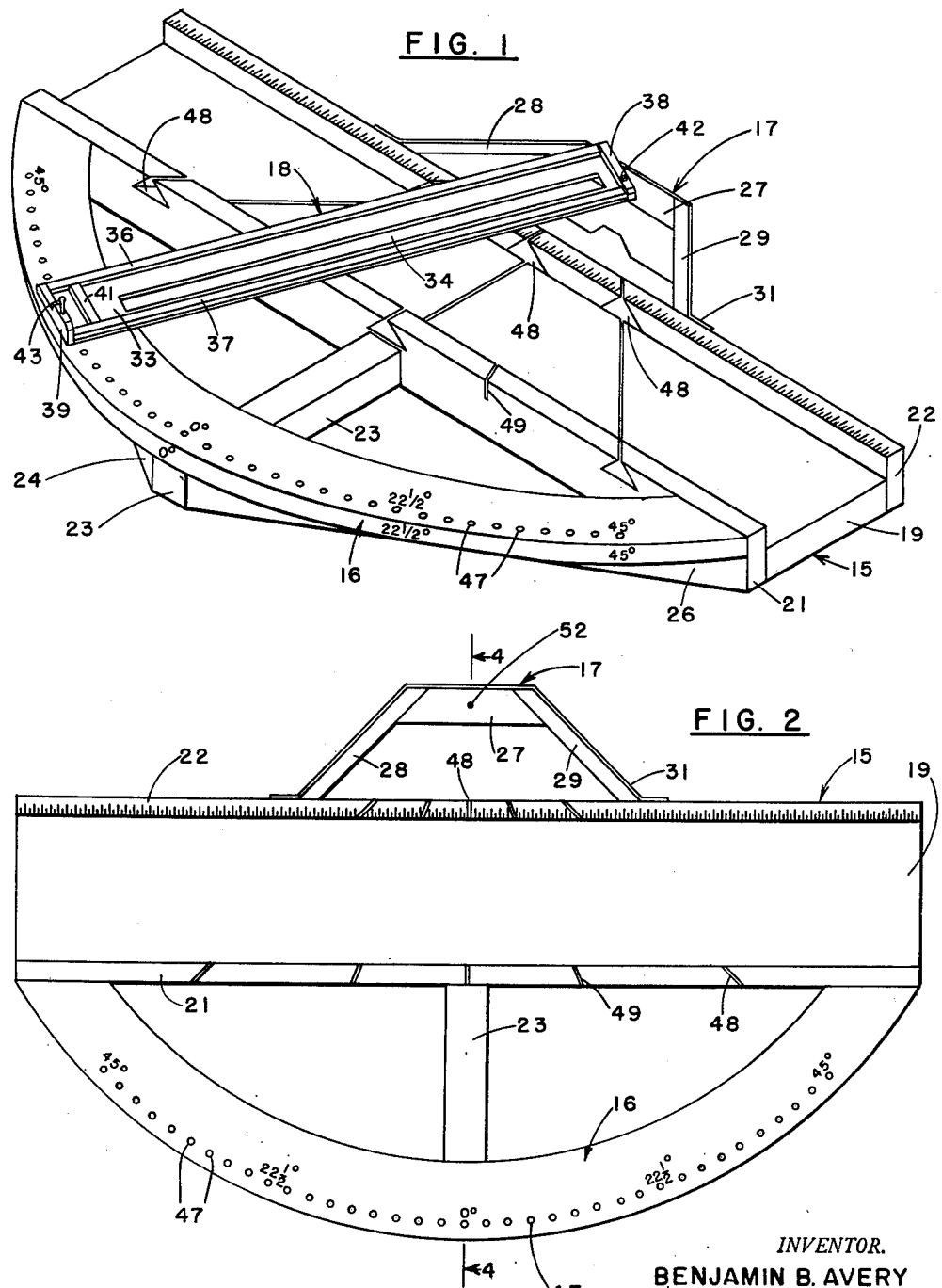

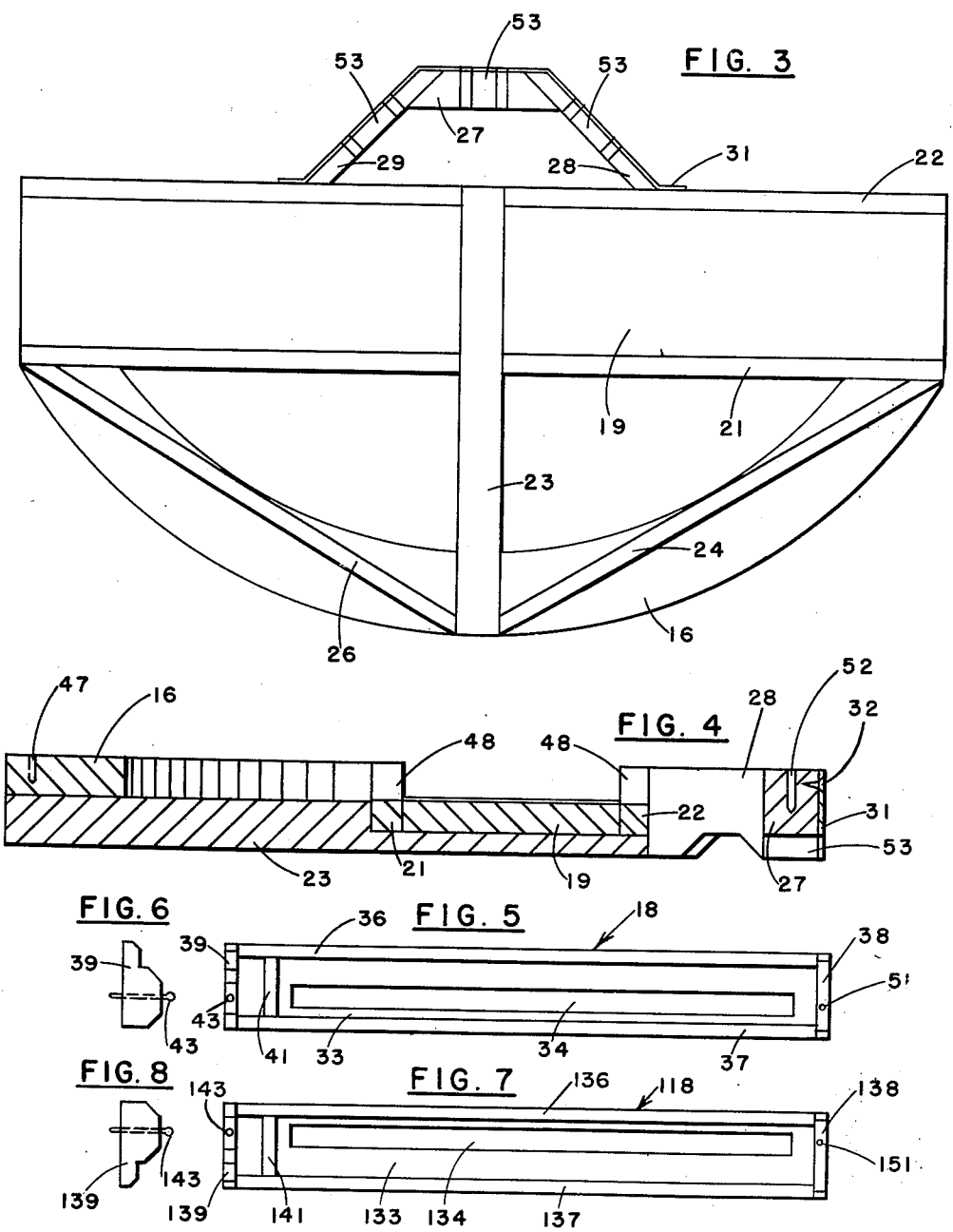

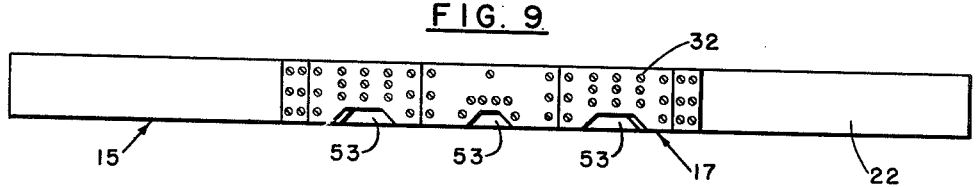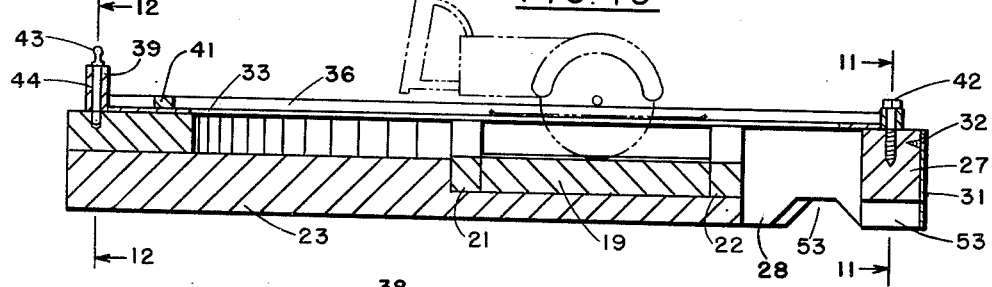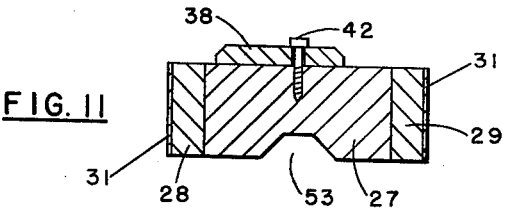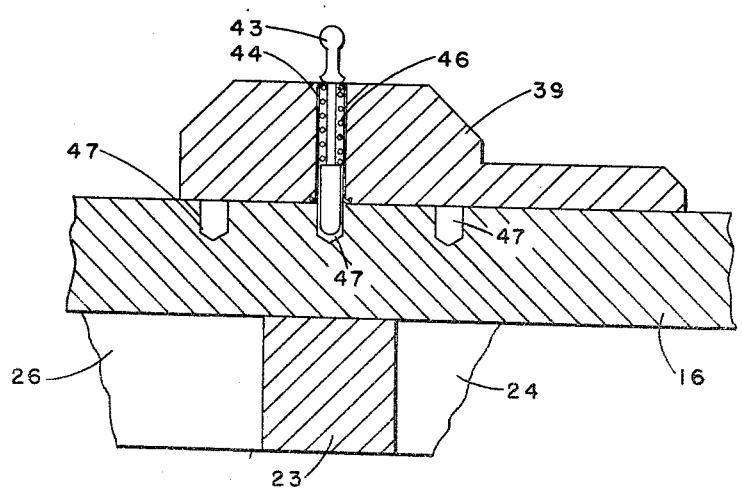

2,595,322

UNITED STATES PATENT OFFICE 2,595,322

MITER GUIDE FOR POWER SAWS

Benjamin Blanton Avery, Tucson, Ariz.

Application November 20, 1950, Serial No. 196,669

1 Claim. (Cl. 143—6)

My invention relates to improved miterboxes. It relates more in particular to a portable miterbox adapted to be used at a building site with a power saw.

Carpenter work at building sites to a considerable extent has continued to be the relatively slow manual art of a generation or more ago. Power saws have come into some use, but in general they can be employed only for relatively rough work, and of course cannot be employed with the old style miterbox intended for use with reciprocating hand saws. Equipment used in mills and factories for sawing special shapes for cabinet work, trim work and the like is not adapted for use at building sites for many reasons, one in particular being that special saws and supports must be used which are impractical or would have only limited utility.

The principal object of my invention is the provision of a portable device in the nature of a miterbox adapted to be used with any of the common power saws.

Another object is the provision of a miterbox so constructed and arranged that the usually inaccurate power saw can be made to function with extreme accuracy to produce the desired type of cut.

Still another object of the invention is the provision of an improved miterbox which is adaptable for use with any usual type of power saw regardless of the location of the cutting blade or special structural or design features of such saw, and in which the known adjustments of some such saws may be used to advantage.

Other specific objects and features of the invention will be apparent from a consideration of the following detailed description taken with the accompanying drawings, in which:

Fig. 1 is a perspective view showing a preferred embodiment of my invention with the saw-supporting guide adjusted to cut at an angle intermediate 90° and 45°.

Fig. 2 is a plan view of the miterbox as shown in Fig. 1, but with the saw-supporting guide removed.

Fig. 3 is a bottom plan view showing structural features.

Fig. 4 is a sectional view taken on the line 4—4 of Fig. 2.

Fig. 5 is a plan view of the saw-supporting guide shown in Fig. 1.

Fig. 6 is an end view thereof.

Fig. 7 is a plan view of a saw-supporting guide for a different type of saw.

Fig. 8 is an end view thereof.

Fig. 9 is a rear elevational view of the miterbox.

Fig. 10 is a sectional view similar to Fig. 4, but showing the saw-supporting guide in position, a conventional type of power saw being shown in dotted lines.

Fig. 11 is a sectional view taken on the line 11—11 of Fig. 10 looking in the direction of the arrows and showing the manner in which the saw-supporting guide is pivoted.

Fig. 12 is an enlarged fragmentary sectional view taken on the line 12—12 of Fig. 10.

Referring now to the drawings: The miterbox of my invention comprises in general a channel-shaped work support 15, an arcuate support and positioning member 16, a pivot support 17, and a saw-supporting guide 18. The saw-supporting guide 18 is pivoted on the pivot support 17 and suitably positioned in a manner which will be described on the arcuate support and positioning member 16, so that when work is carried in the channel-shaped work support 15 and the saw passed from near the arcuate member 16 toward the pivot—that is to say, toward the rear of the miterbox away from the operator—the work will be accurately sawed in accordance with the setting of the saw-supporting guide along the arcuate member 16.

The miterbox of my invention may be produced in various ways and of various types of material, it being essential that it be portable and sufficiently rigid so that accuracy will not be lost. I have produced the embodiment of the invention as shown in the drawings from wood, and very good performance has been obtained using the specific type of construction which will now be described.

The channel-shaped member 15 comprises a bottom member 19 and side members 21 and 22 suitably secured together to form a unitary structure. The supporting beam 23 is mortised as shown in Fig. 4 for firm attachment to the channel member 15; and at its forward end it supports the arcuate member 16, which is suitably formed of laminated wood to the shape shown with its ends secured to the side member 21. Brace members 24 and 26 engage under the arcuate member 16 and have their ends abutting and secured to the beam 23 and the side member 21, as shown particularly in Fig. 3. It will thus be seen that the channel-shaped work support 15 and arcuate supporting and positioning member 16 with the beam 23 and brace members 24 and 26 comprise in effect a unitary structure.

The pivot support 17 consists of three wooden members 27, 28 and 29, and a metal reinforcing strip 31. The members 27—29 are secured together by mortising or any other usual interlocking method common to wood practice. Wood screws 32 threaded into the members 27—29 and the contiguous portions of the upright 22 which the reinforcing strip 31 overlaps contribute to produce a rigid unitary structure. It will be seen, therefore, that the entire structure of the device of my invention, except the saw supporting guide 18, is unitary and sufficiently rugged so that no relative movement can occur between the parts.

The saw-supporting guide 18 comprises a panel 33 having a longitudinal slot 34, side members 26 and 27 which function as saw guides, a rear end member 38 which carries a pivot, a front end member 39 which carries a positioning and stop pin, and a cross member 41 which acts as a stop for the saw on its return, in a manner and for a purpose which will be pointed out. The entire saw-supporting guide may also be formed of wood, and the panel 33 may suitably be the relatively thin and light material known as combed plywood.

I may employ many usual types of pivots, but I have found an ordinary lag screw 42, shown in detail in Fig. 11, eminently suitable for the purpose.

For the purpose of positioning the saw-supporting guide I may employ a simple form of spring plunger comprising a pin 43 extending through a sleeve 44 (Fig. 12) and normally urged downwardly by a spring 46 which is compressed between an inturned flange on the upper part of the sleeve 44 and a stop carried by the pin 43.

The arcuate member 16 is provided with a number of suitably positioned holes 47; and when the pin 43 is in the position shown in Fig. 12, the saw-supporting guide is held against movement about its pivot comprising the lag screw 42. By merely lifting the pin 43 against the spring 46, however, the saw-supporting guide is released and can be adjusted to any desired position around its pivot.

Referring now to Fig. 2, it will be seen that I provide a scale of angles on the upper face of the arcuate member 16, and preferably I mark as 0 that position which will provide a straight-angular cut across the work. The scale then reads to 45° on either side of 0. I am aware that it is customary in shop practice where scales are used to show 90° where I show 0; but I have found that for general convenience of carpenters who are relatively unskilled in the use of precision equipment, my particular arrangement of scale is more readily understood. The holes 47 coincide with scale lines; and while it is unusual that lumber will be cut to odd angles—that is to say, other than 45°, 30°, or an occasional 22.5°—I preferably place the holes 47 at every 2.5°.

The uprights 21 and 22 are provided with kerfs or the like openings to pass the saw blade during a cutting operation, and any suitable arrangement of openings to pass the saw may be employed. Usual power saws cut from the bottom upwardly, so that normally the work would be held against the side member 22. It is therefore possible to leave the center portion of the side member 21 entirely open, because it will not be required to support lumber but only to guide it. As an illustration I show inverted V slots 48 at the cross cut and 45° positions, and uniform slots or kerfs 49 at the 22.5° position.

While saw receiving slots or kerfs are shown for certain angular positions of the saw guide for greater clarity of illustration, it is obvious that such slots or kerfs may be provided on radii corresponding to others or all of the holes 47 in member 16.

I have previously pointed out that my invention is adapted for use with any known power saw; and the guide shown in Figs. 1, 5 and 6 is intended for use with a right hand saw—that is to say, with a saw in which the circular blade is offset to the right of the motor housing. It will be noted that the saw-supporting guide has a hole 51 which receives the lag screw 42, and this hole is in line with the pin 43 and with the slot 34. Also, as shown particularly in Fig. 2, the hole 52 in the pivot member 27 and the 0 positioning hole 47 are in line with the right-angularly positioned V slots 48. With this arrangement, regardless of the position to which the saw-supporting guide is adjusted, the cutting angle will remain true.

In Figs. 7 and 8 I show a saw-supporting guide 118 constructed exactly according to the saw-supporting guide 18, but with the saw blade receiving slot on the lefthand side. To simplify the description I have applied the same reference characters to both saw-supporting guides, but in the case of the saw-supporting guide shown in Figs. 7 and 8 the prefix "1" has been employed to indicate modification. In this case also it will be noted that the same alignment of pivot, pin, and stop is utilized.

Fig. 10 illustrates the manner in which the miterbox of my invention is employed. The arcuate supporting and positioning member 16 forms a firm support for the unpivoted end of the saw-supporting guide, and likewise a firm support for the saw when it is not in use. The stop 41 is so positioned as to engage the rear edge of the saw base or shoe and thus to stop the saw with the circular blade in the open area between the channel 15 and the arcuate supporting and positioning member 16. The saw-supporting guide having been adjusted to proper position, as it may be either before or after the saw is placed on it, boards to be cut are placed in position and the saw reciprocates toward the pivot and back to the rest position. The boards may either be measured and marked before insertion, or the operator may use the scale indicated along the top edge of the member 22. During the time of handling the material on which work is being performed, the saw can rest solidly in position away from the work, as all that is necessary is to trip the saw with the trigger mechanism provided and push it forward along the supporting guide.

It will be seen that only the saw-supporting guide is required to be changed in going from one saw to another. It is obvious of course that the guide may be constructed to receive any saw by merely adjusting the position of the pivots and leaving a sufficient opening to receive any saw blade. But I have found there is a distinct advantage in using a simple fool-proof type of guide and so arranging it that it may be quickly removed and replaced by another guide, if for any reason another type of saw is to be used.

It is known that power saws as now manufactured may be tilted sideways to produce an angular cut in which the angle is with respect to the top and bottom surfaces of the board. It is for this reason that I show the inverted V-shaped slots 48. The miterbox of my invention, in other words, can be used independently of the position of the saw. Also, such saws in general have a provision for raising and lowering the cutting position of the blade. I may therefore take the full depth of the channel member 15, in which case the blade may cut entirely to the member 19 as indicated by the score lines in the drawing; or, if desired, a supporting board may be placed on top of the member 19 and the work in process placed on such supporting board.

It will be noted that I show no table or other supporting member for the device of my invention, and this is intentional. All that is necessary is to place it on a couple of saw horses or other foundation to bring it to convenient working height. There is no necessity of its being level, as long as it is generally in a horizontal position. To facilitate its support, I provide cut-away portions 53 as shown particularly in Fig. 9, the portions between these cut-away portions acting as feet so that regardless of the kind of understructure employed, tilting and tipping will be avoided. I found that if the support is firm, it is by no means essential that more than approximate leveling be obtained.

I referred hereinabove to angles which are conventionally formed at a building site, and stated that it was unusual to cut what I called odd angles, that is, other than 90° and 45°. The practice of limiting the shaping of lumber at a building site has continued because of the limitations of carpenters and the equipment available to them. My invention, therefore, not only permits more expeditious sawing of usual shapes, but also the cutting of special or unusual shapes not heretofore usually cut at the building site. An example may be given of rafters for a slanting roof, where the angle at the ridge and base will differ with the pitch of the roof desired. Before my invention it was the practice to pre-cut rafter lumber, for example two by four, before delivery to the building. This practice has several disadvantages other than cost. One disadvantage is that in using the pre-cut rafters, there is no way of allowing for minor errors in architect's plans, for warpage of lumber, or the like. With my improved miterbox, any desired angle may be cut as determined by simple calculation, or tables showing relation of angle to pitch, and at the time of cutting any needed allowance can be made.

To further illustrate the manner of using the miterbox of my invention, I shall assume that a 45° angle has just been cut on one end of a board, and that a 45° angle is to be cut on the opposite end thereof, but facing in the opposite direction. If, for example, a cut has been made at 45° from the right hand side of the miterbox, looking at Fig. 1, it will then be necessary to move the saw-supporting guide from the right hand side 45° position to the left hand side 45° position. This movement may be made without lifting the saw, because the blade or disc will lie in the open space between the channel 15 and the arcuate support 16 during the entire movement. In practice I have found that the saw-supporting guide may actually be swung around to its new position with one hand while the board is being moved with the other. The manner of operation is basically the same, whatever change is to be made in the adjustment. This simple operation may be compared with that in which the saw must be entirely removed and set to one side, in the case of simple miterboxes in which the saw is loose, or in which the saw must be elevated with two hands in those devices in which the saw is more accurately guided.

I have described my invention in considerable detail so that those skilled in the art may understand the manner of practicing the same, but the scope of the invention is defined by the appended claim.

I claim:

A portable miterbox comprising the combination of a generally channel-shaped work-supporting member including a horizontal base member and vertical side members, an arcuate support and positioning member having its ends in engagement with one side member of the channel near the ends thereof and having an upper face in the plane of the upper edges of the side members, bracing means to secure said arcuate support and positioning member to said one side member so as to leave a generally semi-circular open space therebetween, a pivot member secured to the other side member intermediate its ends and at the opposite side of the channel from the said arcuate member, said pivot member being at a point about which said arcuate member is concentric, a saw-supporting guide engaging the upper face of said arcuate support and the upper edges of said side members having one end thereof pivoted by said pivot member and the other end resting on said arcuate member, and means for securing the said other end at a selected point on said arcuate member.

BENJAMIN BLANTON AVERY.

REFERENCES CITED

The following references are of record in the file of this patent:

UNITED STATES PATENTS

| Number | Name | Date |
| --- | --- | --- |
| 1,758,623 | Roth | May 13, 1930 |
| 2,513,497 | Laughlin | July 4, 1950 |
| 2,559,283 | Dick | July 3, 1951 |